May 24, 1932.　　　F. B. WINES　　　1,859,482
HEATING APPARATUS FOR AUTOMOTIVE VEHICLES
Filed Jan. 24, 1930　　　4 Sheets-Sheet 1

INVENTOR
FRED B. WINES

ATTORNEYS

May 24, 1932.　　　　　F. B. WINES　　　　　1,859,482
HEATING APPARATUS FOR AUTOMOTIVE VEHICLES
Filed Jan. 24, 1930　　　4 Sheets-Sheet 2
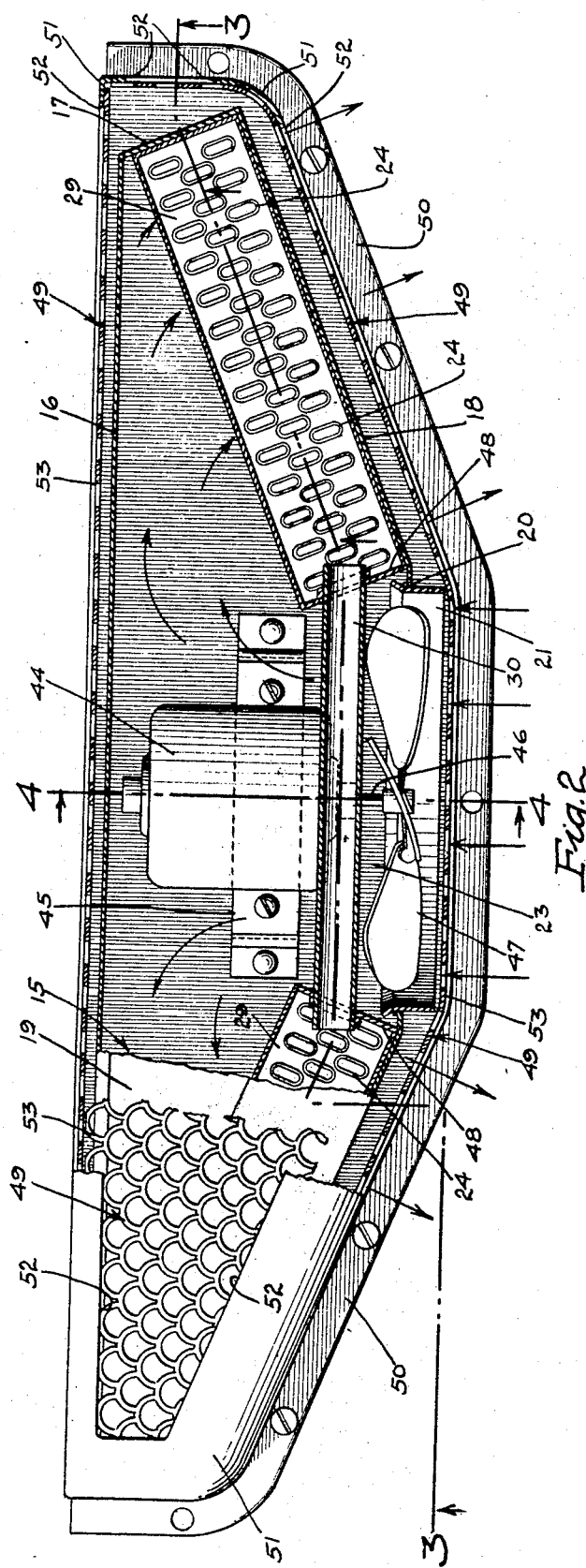
INVENTOR
FRED B. WINES
ATTORNEYS

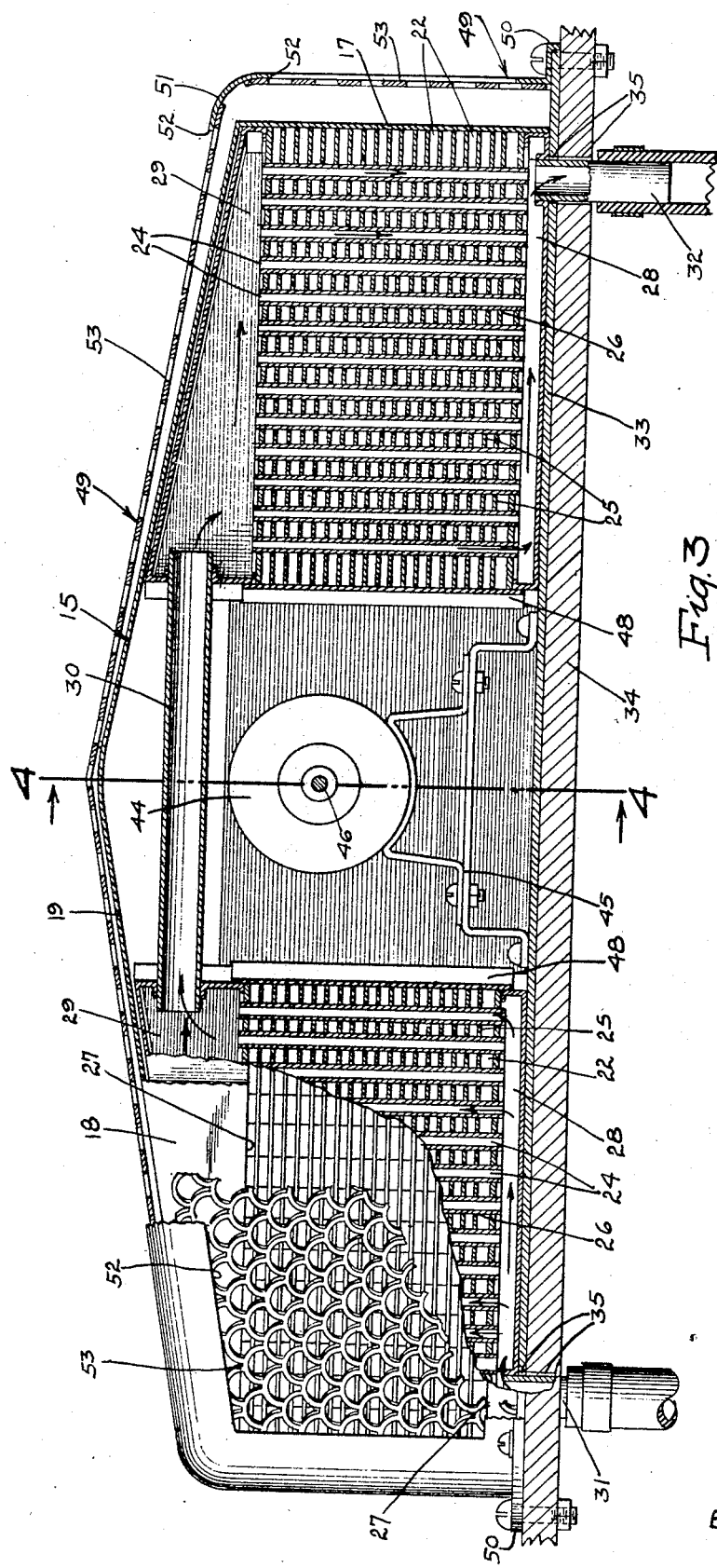

May 24, 1932.  F. B. WINES  1,859,482
HEATING APPARATUS FOR AUTOMOTIVE VEHICLES
Filed Jan. 24, 1930  4 Sheets-Sheet 4
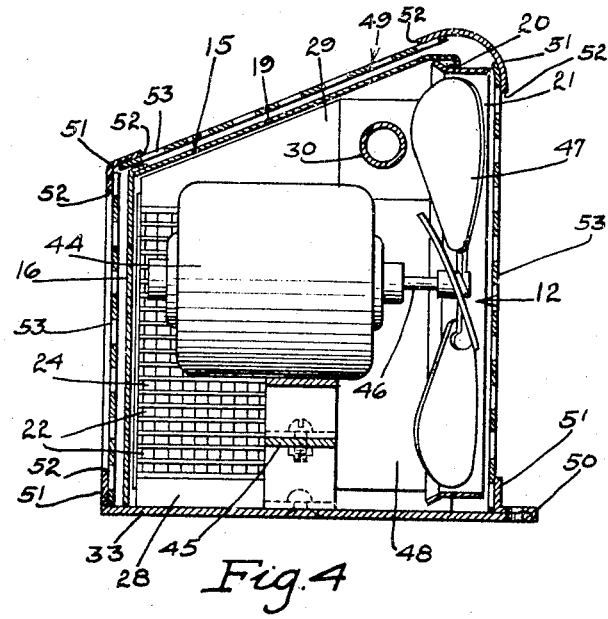
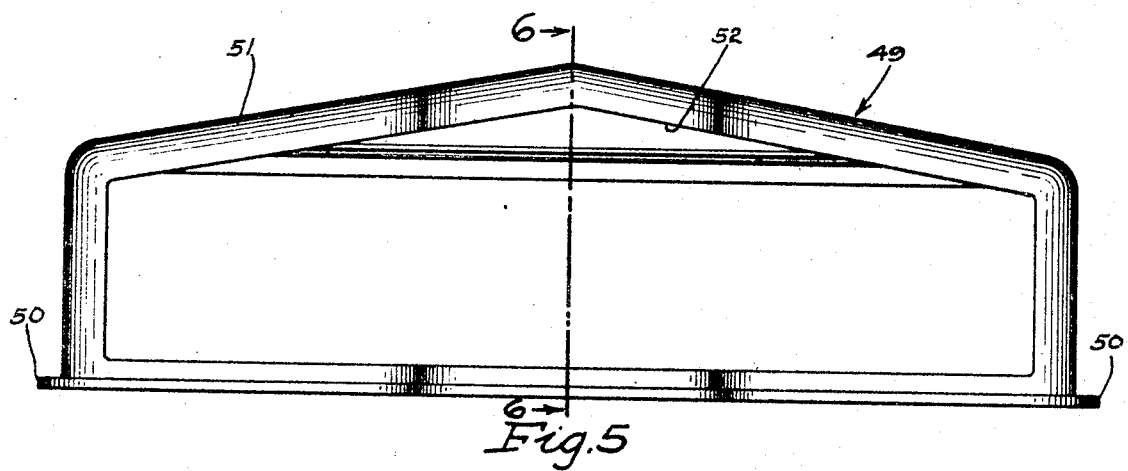
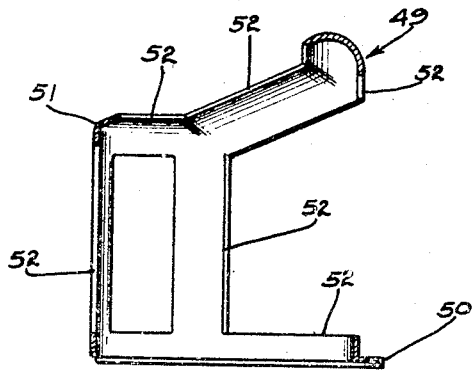
INVENTOR
FRED B. WINES
ATTORNEYS Patented May 24, 1932

1,859,482

UNITED STATES PATENT OFFICE

FRED B. WINES, OF MINNEAPOLIS, MINNESOTA, ASSIGNOR TO TROPIC-AIRE, INCORPORATED, OF MINNEAPOLIS, MINNESOTA, A CORPORATION OF DELAWARE

HEATING APPARATUS FOR AUTOMOTIVE VEHICLES

Application filed January 24, 1930. Serial No. 423,064.

This invention relates to an apparatus for heating automotive vehicles and has more particular reference to a heater adapted to rest upon the floor of a vehicle body, as, for example, in the rear compartment of a taxicab or other passenger vehicle.

An object of the invention is to provide an automotive vehicle heater of the general type as disclosed in the application of Vernon J. Butterfield, Serial No. 341,403, filed February 20, 1929, and in my pending application Serial No. 394,697, filed September 23, 1929, and presenting certain improvements over the disclosures of said applications.

A further object is to provide an automotive vehicle heater, more especially adapted to rest upon a vehicle floor, which will include a heating element, and means for forcibly bringing air into contact with the heating element, to thus cause the air to be continuously heated and circulated within the vehicle body.

A still further object is to provide an automotive vehicle heater, more especially adapted to rest upon a vehicle floor, which will include a heating element having a plurality of air-circulating passages associated with water-circulating passages to be connected in the usual water-circulating system of the vehicle engine, and means for withdrawing air from the interior of the vehicle body and for returning the withdrawn air back into the vehicle body interior, the said withdrawing and returning means being adapted to cause the air to travel through the air-circulating passages to thus be heated and kept in continuous circulation within the vehicle body.

And a still further object is to provide a heating apparatus for an automotive vehicle, including a heating element, an air withdrawing and returning means, and an operative association of the heating element with the air withdrawing and returning means, all having the novel and improved features and characteristics of construction as now to be fully described, it being understood that the disclosure herein is merely illustrative and intended in no way in a limiting sense, changes in details of construction and arrangement of parts being permissible so long as within the scope of the claims which follow.

In the accompanying drawings forming a part of this specification,

Fig. 2 is an enlarged plan view, partially sectioned and partially broken away, of the heating element and the air-circulating and returning means of the improved apparatus;

Fig. 3 is an enlarged vertical, longitudinal, sectional view of said heating element and air withdrawing and returning means, partially in elevation and partially broken away, the section being taken substantially as on line 3—3 in Fig. 2, and also disclosing the connections between the heating element and the vehicle engine water-circulating cooling system;

Fig. 4 is a transverse sectional view, taken substantially on line 4—4 in Fig. 2 or Fig. 3;

Fig. 5 is an elevational view of the heating element cover with the heating element housing removed therefrom; and Fig. 6 is a transverse sectional view taken on line 6—6 in Fig. 5.

Figure 1:
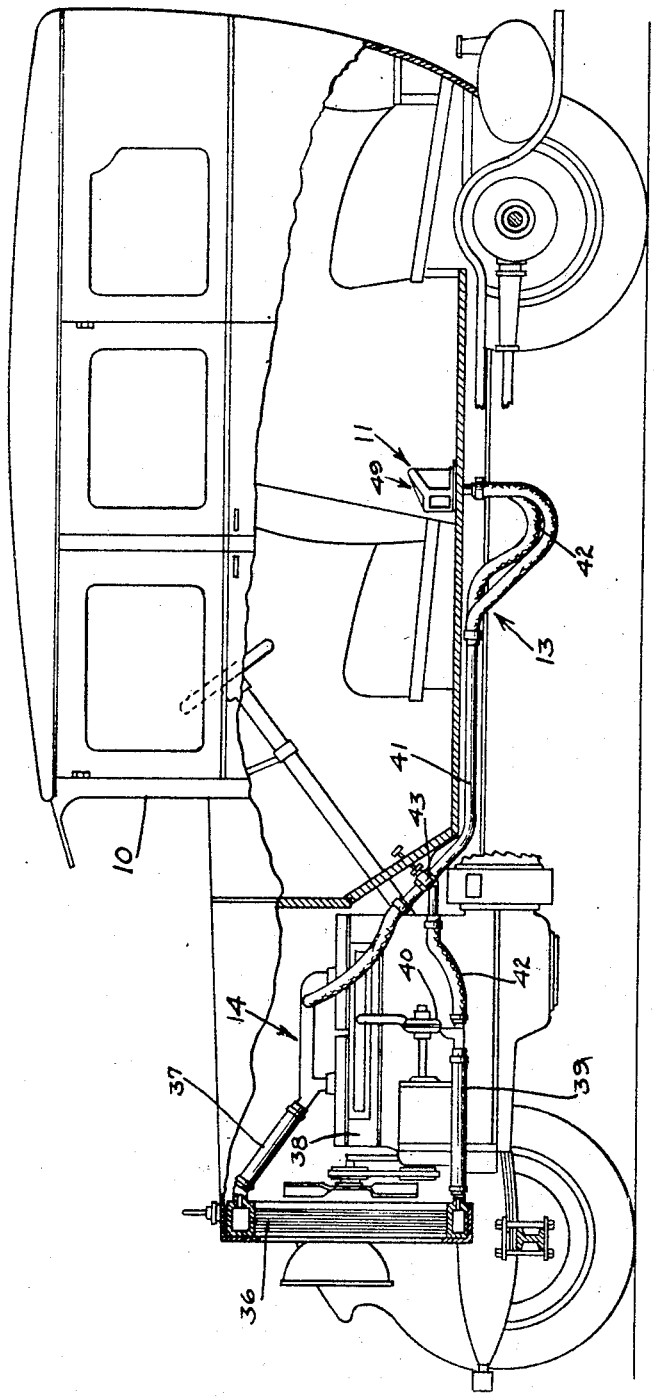
Fig. 1 is a side elevational view, partially sectioned and partially broken away, of an automotive vehicle, disclosing a heating apparatus, made in accordance with the present invention, associated with said vehicle, the heating element of said apparatus being situated upon the front portion of the floor of the rear compartment or tonneau of the vehicle.

With respect to the drawings and the numerals of reference thereon, 10 denotes an automotive vehicle equipped with a heating apparatus consisting, generally of a heating element 11, disclosed as resting upon the vehicle floor, means 12, disclosed as housed by said heating element, for forcibly circulating air through the heating element, and connections 13 between the heating element and the water-circulating system 14 of the vehicle engine. As shown in Fig. 1, the heating element 11 is situated upon the front portion of the floor of the rear compartment or tonneau of the vehicle, adjacent the front seat, but said heating element could be otherwise situated in the vehicle body, as for example, upon the floor at the rear of the rear compartment or tonneau, adjacent the rear seat, or in the front compartment of the vehicle.

The heating element 11 includes a housing 15 having a wall 16, the rear wall as shown in Fig. 1, considered from the standpoint of its position in the rear tonneau, extending almost the whole length of the heating element, short end walls 17 integral with the ends of the rear wall 16 and diverging therefrom, a front wall integral with the forward edges of the end walls 17 and including portions 18 extending generally toward each other in divergent relation to the rear wall 16, and a top wall 19 integral with or suitably attached to all of the other walls. The front wall is cut away as at 20, and a circular member 21 is suitably fitted in the cut-out portion 20. The housing 15 has horizontally disposed air-circulating passages 22 and includes a space 23 between said passages in which the air forcing means 12 is situated desirably at the midlength of the heating element. The housing 15 has two sets of water-circulating tubes or passages 24, including a set for each set of air-circulating passages 22, connected in the water-circulating system 14 of the vehicle engine and intimately contacted with by the air-circulating passages 22. The water-circulating tubes or passages 24 of each set of water-circulating tubes or passages may be located in spaced apart apertures 25 in spaced apart plates 26, defining the air-circulating passages 22, to constitute spaced apart interior units of the heating element, each preferably adjacent one of the oblique portions 18 of the front wall of the housing 15. Desirably, the tubes or passages 24 snugly fit the apertures in the plates, and after assembly of the tubes or passages with the plates, the resulting interior units are dipped in solder, in order to fix the plates in spaced relation along the tubes and to provide water-seals between the perforations of the outermost plates and the said tubes or passages adapted to preclude the passage of water to position between the plates and tubes. The inner sides of the air-circulating passages open to the space 23 in which the air forcing means 12 is arranged, and the outer sides of said air-circulating passages open to the front of the heating element through cut-out portions 27 in the portions 18 of the front wall, said portions 18 being cut-away to offer no interference to air made to travel through said air-circulating passages. A water-tight casing for each interior unit of the heating element includes a bottom chamber 28 attached to the side and end marginal portions of the lowermost plate 26, and a top chamber 29 attached to the side and end marginal portions of the uppermost plate 26. A pipe 30 in the space 23 suitably connects the top chambers 29 of the different interior units of the heating element with each other. The bottom chamber 28, the one at the left in Fig. 3, which is situated beneath the lower ends of the tubes or passages 24 of the corresponding interior unit of the heating element, is communicated with by an inlet pipe 31, and communicates with the upper ends of the tubes or passages 24 of the opposite interior unit through the top chambers 29 and the pipe 30, while the bottom chamber 28, the one at the right in Fig. 3, situated beneath the lower ends of the tubes or passages 24 of the said opposite interior unit, communicates with an outlet pipe 32. The casing for the interior units and the housing 15 rest upon a floor plate 33, and the floor plate in turn rests upon and is secured to the vehicle floor 34 in any suitable manner. The inlet and outlet pipes 31 and 32 pass downwardly through apertures 35 in the floor plate and in the vehicle floor.

The construction and arrangement above described provides air-circulating passages through the heating element, leading from the interior of said heating element and diverging outwardly to the vehicle body, as will be more clear from Fig. 2. Provision is made for causing hot water to flow through the heating element 11 by way of the inlet pipe 31, the water chamber 28 at the left in Fig. 3, the adjacent water-circulating tubes or passages 24, the corresponding water chamber 29, the connecting pipe 30, the opposite water chamber 29, the water-circulating tubes or passages 24 beneath said opposite water chamber, the water chamber 28 at the right in Fig. 3, and the outlet pipe 32, so that air which passes through the air-circulating passages 22 will be heated.

Numeral 36 represents the water cooling radiator of the vehicle engine, 37 denotes a connection between the water jacket 38 of said engine and said radiator, 39 designates a connection between the radiator and the water jacket, and 40 indicates a pump in the connection 39 for forcing a flow of cooling water through the water-circulating cooling system of the engine from the upper portion of the water jacket through the connection 37 to the radiator and from the radiator through the connection 39 and pump 40 back to the water jacket, in the usual manner. A connection 41 leads from the connection 37 to the inlet pipe 31, and a connection 42 leads from the outlet pipe 32 to a portion of the connection 39 in advance of the water pump 40. An adjustable shut-off valve 43 is situated in the connection 41 as disclosed. By regulation of this shut-off valve, a portion of the water of the water-circulating system can, evidently, be caused to flow from the water jacket through the connection 41 and the intake pipe 31, through the heating element, and back to the water jacket, through the outlet pipe 32, the connection 42, and the pump 40 (in the connection 39). Clearly, an arrangement (such as disclosed in the reissue patent to Caesar, No. 17,131, granted November 13, 1928), adapted to cause all of the water of the water-circulating system to flow through the heating element, could be substituted for the arrangement illustrated and just described. When the shut-off valve 38 is closed, there will be no flow of water through the heating element as will be obvious.

An electric motor 44, situated within the space 23 and supported upon the floor plate 33, as by brackets 45, includes a motor shaft 46 fixedly supporting a fan 47 desirably situated within the circular member 21. A motor of variant type could be substituted for the electric motor disclosed. As illustrated, the brackets 45 include an ordinary bracket supported desirably upon the floor plate 33, and a shaped bracket having a curved length of material desirably attached to the lower portion of the motor, as by welding, outwardly and downwardly extending arms, and extension upon said arms resting upon the ordinary bracket, the extensions receiving screw bolts which pass through the ordinary bracket.

The inner ends of the air-circulating passages 22 are suitably closed by plates 48 which abut the inner ends of the plates 20, see Fig. 4, the said plates 48 being situated adjacent the circular member 21, in position to direct air passing the fan 47 through the full length of the air-circulating passages 22.

A cover 49 for the housing 15, of the same general shape as the housing and surrounding said housing in spaced relation thereto, may include perforated front, rear, end and top walls. Said cover 49 may be secured to the vehicle floor in any convenient manner, as by screws adapted to be inserted through openings in flanges 50 of the cover, and the walls of the cover may be formed in any ordinary or preferred manner. As shown, the cover 49 is constructed to be ornamental. It consists of a generally rectilinear frame 51 having open walls 52 which conveniently receive grids 53 constituting the perforated walls of the cover.

The fan 47 is adapted to withdraw air from the interior of the vehicle body, through the perforated front wall of the cover 49 and the circular member 21, inwardly to the space 23, and to return the heated air back into the vehicle body through the air-circulating passages 22, and said perforated front wall of the cover, it being evident that the air forced through the air-circulating passages of the different interior units by the fan will leave the heating element in two diverging streams of air upon the re-entry of the air to the vehicle body interior. Thus the heated air will be more thoroughly spread throughout the area of the vehicle body interior. It will be evident that the fan 47 could be rotated to draw air from the vehicle body inwardly through the air-circulating passages and to return the air to the vehicle body through the circular member 21.

Adjustment of the shut-off valve 43 regulates the amount of hot water allowed to flow through the heating element when the pump 40 is operating, and adjustment of the speed of rotation of the fan 47 regulates the amount of air withdrawn from the vehicle body to the heating element and pushed back into the vehicle body. Evidently, when the fan 47 is in operation, the air within the vehicle body is caused to be continuously circulated, through the heating element 11 and by the air forcing or withdrawing and returning means 12, to thus be heated by hot water flowing through the water circulating tubes or passages 24 and the hot water chambers 28 and 29 of the heating element. When the shut-off valve 43 is closed, so that no hot water is circulated through the heating element, the fan 47 can keep the air within the vehicle body in circulation without heating said air. The rate of circulation of air through the air-circulating passages 22 determines the rate at which heat is absorbed from the hot water flowing through the heating element. When the fan 47 is put out of operation while the valve 43 is open and the pump 40 is operating to force water through the heating element, but a small amount of heat will be dissipated to the interior of the vehicle body from the heating element.

I claim as my invention:

1. In combination, a heating element adapted to be positioned in a closed body and including air-circulating passages arranged in spaced apart, oblique relation to each other and opening to said closed body, means for supplying heat to said air-circulating passages, and air propelling means adjacent said air-circulating passages for withdrawing air from said closed body and for returning said withdrawn air back into said closed body, the said air propelling means being adapted to cause the said withdrawn and returned air to travel through said air-circulating passages, to thus be heated and kept in continuous circulation within the closed body.

2. In combination, a heating element adapted to be positioned in a closed body and including a plurality of sets of air-circulating passages opening to said closed body, the different sets of air-circulating passages being arranged in spaced apart oblique relation to each other, means for supplying heat to said air-circulating passages, and air propelling means between said air-circulating passages of the different sets for withdrawing air from said closed body and for returning said withdrawn air back into said closed body, the said air propelling means being adapted to cause the withdrawn and returned air to travel through said air-circulating passages, to thus be heated and kept in continuous circulation within the closed body.

3. In combination, a heating element adapted to be positioned in a closed body and including a plurality of sets of air-circulating passages opening to said closed body, the different sets of air-circulating passages being arranged in spaced apart, oblique relation to each other, means for supplying heat to said air-circulating passages, air propelling means for withdrawing air from said closed body and for returning said withdrawn air back into said closed body, the said air propelling means being adapted to cause the withdrawn and returned air to travel through said air-circulating passages, to thus be heated and kept in continuous circulation within the closed body, and a motor adapted to support said air propelling means between said air-circulating passages.

4. The combination with a heating element including a housing adapted to be positioned within a vehicle body, a plurality of spaced apart casings enclosed by said housing and arranged in oblique relation to each other, each casing having air-circulating passages communicating at one side with the interior of said housing and at the other side with the vehicle body, and a fluid-heating-medium passage associated with said air-circulating passages, of an air propeller in said housing, and means for actuating said air propeller.

5. In combination with a heating element including a housing adapted to be positioned upon the floor of a vehicle body, a plurality of spaced apart casings enclosed by said housing and arranged in oblique relation to each other, each casing having air-circulating passages communicating at one side with the interior of said housing and at the other side with the vehicle body, and a fluid heating passage associated with said air-circulating passages, of an air propeller in said housing and between said casings, and means for actuating said air propeller.

6. In combination with a heating element including a housing adapted to be positioned within a vehicle body, a plurality of spaced apart casings enclosed by said housing and arranged in oblique relation to each other, each casing having air-circulating passages, and means for heating said air-circulating passages, of air propelling means for withdrawing air from said vehicle body and into said housing and for returning said withdrawn air to the vehicle body, said air propelling means being adapted to cause said air to pass through said air-circulating passages, and means for actuating said air propelling means.

7. In combination with a heating element including a rear wall and spaced apart front walls arranged in divergent relation to said rear wall, a plurality of spaced apart casings enclosed by said housing and arranged adjacent said front walls, each casing having air-circulating passages communicating at one side with the interior of said housing and at the other side with the vehicle body, and means for supplying heat to said air-circulating passages, of air propelling means in said housing, and means for actuating said air propelling means.

In witness whereof, I have hereunto set my hand this 20 day of Jan., 1930.

FRED B. WINES.